US006556167B1

(12) United States Patent
Disselkoen et al.

(10) Patent No.: US 6,556,167 B1
(45) Date of Patent: Apr. 29, 2003

(54) DIRECT ACQUISITION OF VERY LARGE PN SEQUENCES IN GPS SYSTEMS

(75) Inventors: Brent A. Disselkoen, Cedar Rapids, IA (US); William C. Caldwell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/321,996

(22) Filed: May 28, 1999

(51) Int. Cl.[7] ........................... H04B 7/185; H04B 15/00
(52) U.S. Cl. .................... 342/357.06; 375/208
(58) Field of Search ................... 342/357.06; 375/208, 375/210, 349, 150

(56) References Cited

U.S. PATENT DOCUMENTS 5,305,347 A * 4/1994 Roschmann et al. ........... 375/1
5,319,634 A * 6/1994 Bartholomew et al. ........ 370/18
5,396,515 A * 3/1995 Dixon et al. ................. 375/208

* cited by examiner

Primary Examiner—Thomas H. Tarcza
Assistant Examiner—Dao L. Phan
(74) Attorney, Agent, or Firm—Nathan O. Jensen; Kyle Eppele

(57) ABSTRACT

A receiver and method for acquiring a large pseudorandom (PN) sequence such as a GPS P(Y) code signal with poor or no knowledge of an external time reference are disclosed. A reference PN sequence is sectioned into a predetermined number of subsequences. The large PN sequence to be acquired is received from a remote source. The received PN sequence is correlated with each of the predetermined number of subsequences simultaneously. The large PN sequence is acquired, and a GPS solution may be provided, in the event the correlation produces a correlation between the received PN sequence and one of the predetermined number of subsequences. The large PN sequence may acquired without knowledge of an external time reference in a reasonable amount of time (e.g., less than ten minutes).

8 Claims, 4 Drawing Sheets

DIRECT ACQUISITION OF VERY LARGE PN SEQUENCES IN GPS SYSTEMS

FIELD OF THE INVENTION

The present invention generally relates to the field of GPS systems and particularly to acquisition of PN sequences in GPS systems.

BACKGROUND OF THE INVENTION

In GPS P(Y) code acquisition, the PN spread spectrum sequence is a one week long sequence having a rate of 10.23 MHz (6,187,104,000,000 bits). With no knowledge of an external time reference and with present digital correlator technology, it is impractical to accomplish a direct acquisition of a very large PN sequence such as the GPS P(Y) code in a reasonable amount of time (e.g., less than ten minutes).

Typical P(Y) code acquisition techniques involve correlating a reference PN signal with the transmitted PN sequence at all possible code positions. This correlation generally involves sequentially advancing the reference PN sequence with respect to the transmitted PN sequence until correlation is detected (indicating identity of the sequences). However, with very large length PN sequences and no knowledge of an external time reference, it is often impractical to sequentially correlate at all code positions in a reasonable amount of time due to the finite number of correlation processors available. Thus, there lies a need to provide a system and method for acquiring a relatively large, finite PN sequence in a reasonable period of time without knowledge or with poor knowledge of an external time reference.

SUMMARY OF THE INVENTION

The present invention is directed to a method for acquiring a pseudorandom (PN) sequence. In one embodiment, the method includes steps for sectioning a reference PN sequence into a predetermined number of subsequences, (with possible gaps between the subsequences) receiving the PN sequence from a remote source, correlating the received PN sequence with each of the predetermined number of subsequences simultaneously, and in the event the correlating step produces correlation between the received PN sequence and one of the predetermined number of subsequences, acquiring the received PN sequence.

The present invention is further directed to a GPS receiver for acquiring a GPS P(Y) code signal without knowledge or with poor knowledge of an external time reference. In one embodiment, the receiver includes a first filter and amplifier for selecting a predetermined frequency band of a received GPS signal and for amplifying the filtered signal, a first converter for converting the received GPS signal into an intermediate frequency signal, a second filter and amplifier for filtering and amplifying the intermediate frequency signal, a second converter for converting the filtered and amplified intermediate frequency signal into a digital signal representative of the GPS signal, and a processor for receiving the digital signal, the processor being configured to simultaneously correlate the digital signal with a plurality of subsequences of a reference signal such that the GPS signal is acquired upon correlation of the digital signal with one of the plurality of subsequences of the reference signal.

It is an object of the present invention to provide a method and appartus for acquiring large PN sequences in a short period of time.

It is a feature of the present invention to acquire a large PN sequence in six minutes or less.

It is a feature of the present invention to acquire a large PN sequence by holding the reference PN sequence fixed and waiting until the received PN sequence generates a match between the sequences.

It is an advantage of the present invention to acquire a large PN sequence without a time reference.

It is an advantage of the present invention to acquire a large PN sequence with a poor time reference.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
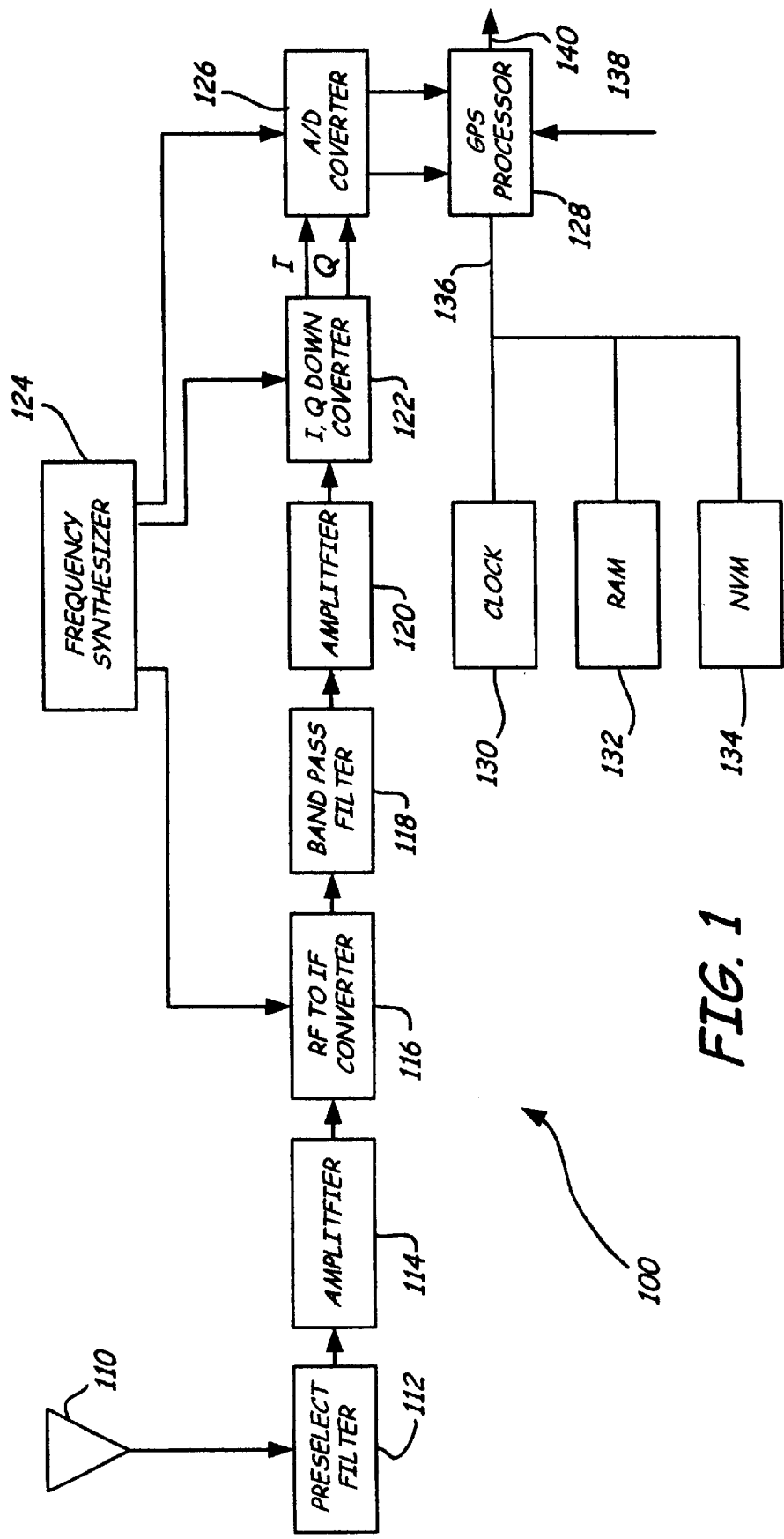
FIG. 1 is a block diagram of a GPS receiver and processor operable to tangibly embody the present invention.

Referring now to FIG. 1, a block diagram of a GPS receiver operable to tangibly embody the present invention will be discussed. The GPS receiver 100 includes an antenna 110 for receiving a pseudorandom (PN) sequence signal such as the P(Y) code transmitted from a space vehicle in a global positioning system (GPS). The received signal is applied to the input of a preselect filter 112 (e.g., a band pass filter) for selecting the frequency of the received signal. The filtered signal is amplified by an amplifier 114 that is preferably a low noise amplifier (LNA). The signal is then converted from a radio-frequency (RF) signal to an intermediate frequency (IF) signal by RF to IF converter 116. The intermediate frequency signal is then further filtered by band pass filter 118 and further amplified by amplifier 120. The signal is then down converted into in-phase (I) and quadrature (Q) components by I, Q down converter 122. The I and Q components are converted into a digital signal by A/D converter 126 and then provided to GPS processor 128. GPS processor 128 preferably comprises or includes a signal processor (digital, optical, analog, etc.) for implementing faster processing of signal processing algorithms (e.g., correlations, convolutions, etc.). A frequency synthesizer 124 provides a reference signal of a predetermined frequency to RF to IF converter 116, I, Q down converter 122, and to A/D converter 126. A real-time clock 130, random-access memory (RAM) 132 and non-volatile memory (NVM) 134 couple with GPS processor 138 via bus 136. GPS processor may receive an auxiliary signal 138 from an auxiliary signal source, for example as a reference signal for providing a Doppler correction of a received GPS signal. The result of the acquisition of the PN signal, such as a coarse/acquisition (C/A) solution of a GPS signal may be provided at an output 140 of GPS processor 128 according to known GPS processing techniques.

Figure 2:
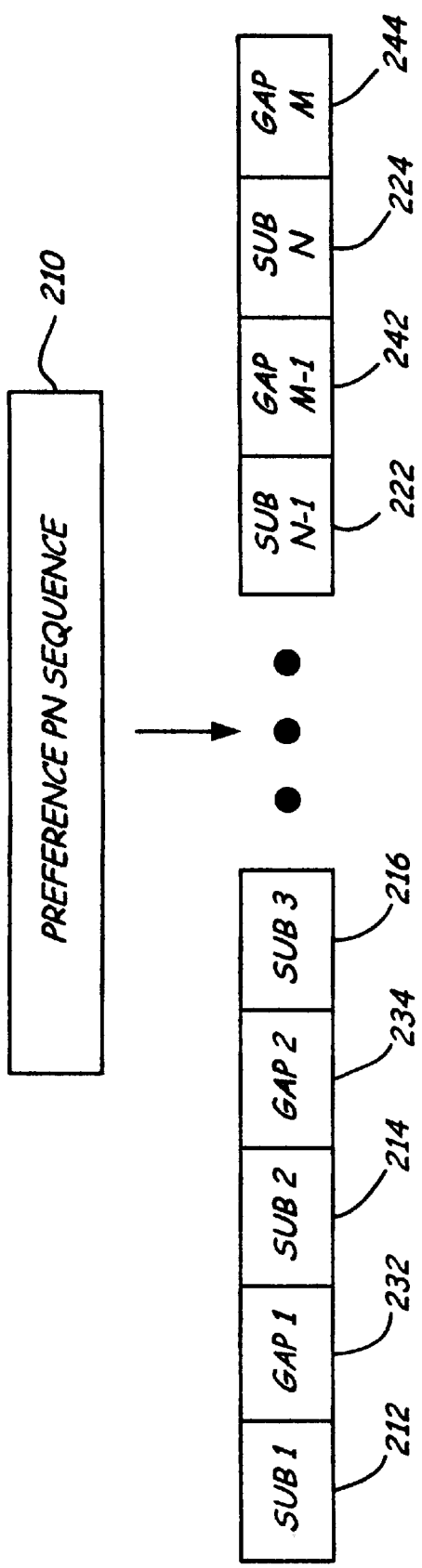
FIG. 2 is a block diagram illustrating the preprocessing of a reference PN sequence in accordance with the present invention.

Referring now to FIG. 2, the preprocessing of a reference PN sequence in accordance with the present invention will be discussed. The reference PN sequence 210, the sequence against which an incoming PN sequence received by receiver 100 is correlated, is sectioned into a plurality of subsequences: subsequence 1 (212), subsequence 2 (214), up to subsequence N (224) where N is the number of subsequences. Gaps can exist between the subsequences as shown in FIG. 2 with gap 1 (232) through gap M (244) where M is the number of gaps. The subsequences and gaps can be of differing lengths. In the particular case of GPS P(Y) code acquisition, the PN spread spectrum sequence is a one-week long sequence having a rate of 10.23 MHz (6,187,104,000,000 bits). The entire reference P(Y) code is sectioned into many (N) spaced fixed reference PN subsequences 212–224 with many (M) gaps 232–244. The GPS P(Y) code can be segmented into approximately 15000 subsequences of 204,600 bits (20 milliseconds) each, which comprises only a small portion of the entire sequence. Since the phase of the incoming signal is correlated with an in-phase and quadrature reference, 7500 in-phase and quadrature subsequence pairs are used in a preferred embodiment of the present invention. In this case N=7500. Different numbers of subsequences and numbers of bits in the subsequences can also be used. The reference PN sequence, either as a whole sequence 210 or as individual subsequences 212–224, may be stored in non-volatile memory 134 until required by processor 128 (e.g., to perform a correlation with an incoming PN sequence). The reference sequence may be stored in memory in a digitized format.

Figure 3:
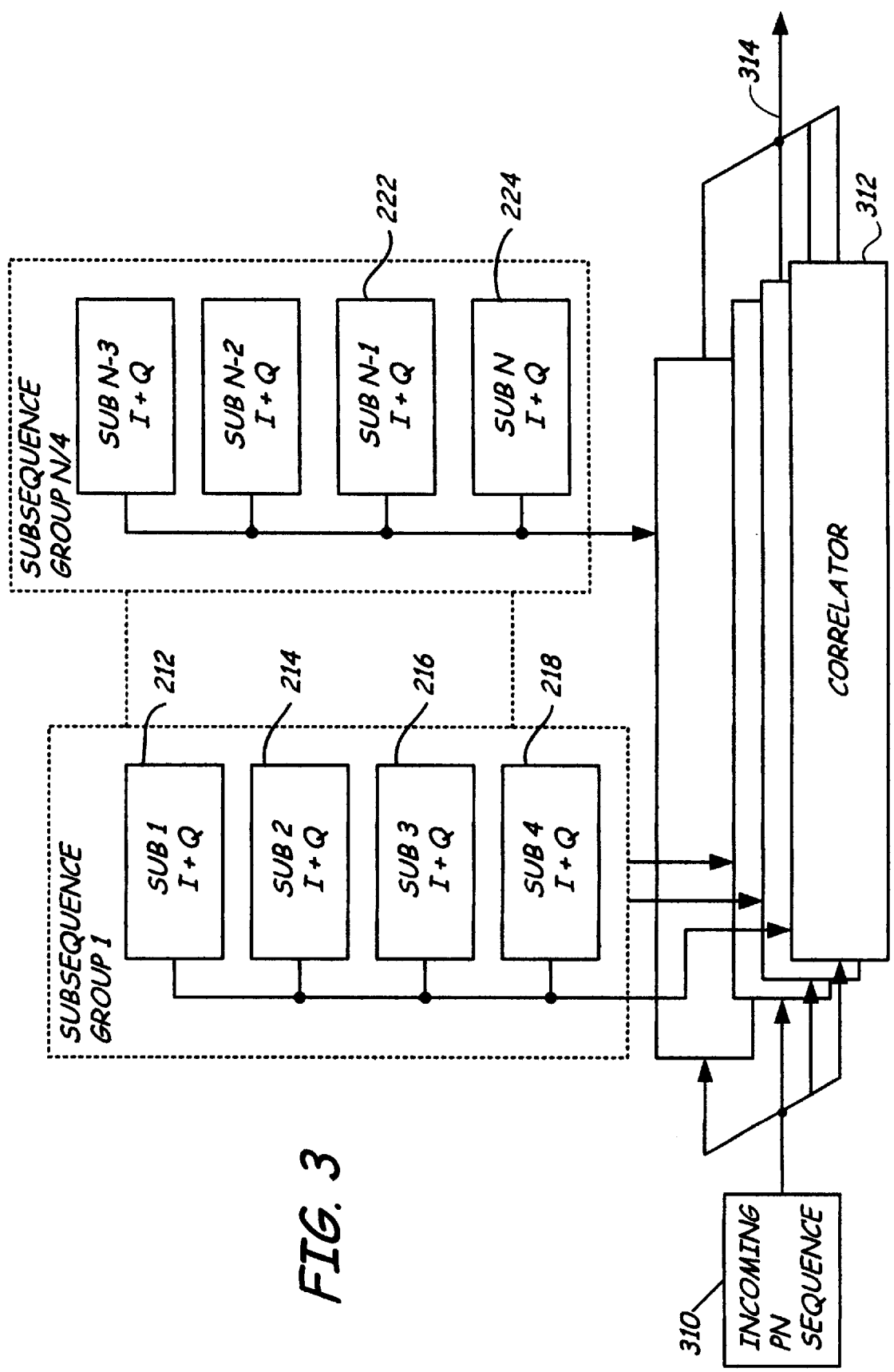
FIG. 3 is a block diagram of a correlator operable with the present invention.

Referring now to FIG. 3, a block diagram of a correlator operable with the present invention will be discussed. The acquisition of an incoming PN sequence 310 involves near continuous correlation of the fixed reference PN subsequences 212–224 simultaneously with a received, incoming PN sequence 310. The subsequences used with a typical correlator 312 are arranged in groups such that group 1 includes I and Q subsequence 1 (212) followed by I and Q subsequence 2 (214), I and Q subsequence 3 (216) and I and Q subsequence 4 (218). Subsequence 2 (214) is selected to be one bit later than subsequence 1 (212) in the reference PN sequence. I and Q subsequence 3 (216) is selected to be one bit later than subsequence 2 (214) and I and Q subsequence 4 (218) is one bit later than subsequence 3 (216). The groups of four I and Q subsequences are evenly spaced over the incoming PN sequence 310. With correlator response time of approximately 396 nanoseconds or four bits of the incoming PN sequence 310, the four subsequences (212–218) are overlaid with their one bit delay with respect to each other. A correlation is made between the 204,600 bits of incoming PN sequence 310 and the 15,000 sequences 212 through 224 simultaneously. The overlay of four bits for each I and Q subsequence in a group allows for the correlation of these four I and Q subsequences during a correlator response period resulting in 1875 subsequence groups to be correlated simultaneously. The correlator 312 can consist of 15,000 parallel correlation channels or 15,000 individual correlators to perform the correlation operation simultaneously between the incoming PN code and the 1875 subsequence groups in the same fashion as described for the first group of I and Q subsequences and the corresponding correlator 312 channel. This correlation operation is performed in a near continuous fashion on the incoming PN sequence limited by the correlator response time of 396 nanoseconds in this example. The output of the I and Q correlations can be combined mathematically in an envelope or power detector.

With 1875 subsequence groups evenly spaced over the entire incoming PN sequence 310 of one week or 604,800 seconds, one subsequence group is present in each 320 second period of the code or one uniform gap length. In the current embodiment with a correlator response time of 396 nanoseconds or four PN code bits, the incoming PN code shifts four bits relative to the 1875 subsequence groups while a correlator operation is performed. To search the entire window of uncertainty, approximately 320 seconds would be required. In this example, the worst case acquisition time of a desired correlation is approximately 320 seconds or under six minutes. Other correlation intervals can be used depending on the correlator and other numbers of subsequences can be used resulting in different acquisition times.

Instead of sequentially advancing reference PN sequence 210 with respect to incoming PN sequence 310, the incoming PN sequence propagates through the receiver 100 and at times determined by the correlator response time, the subsequences 212–224 are correlated with the incoming sequence 310. As one of the reference PN subsequences 212–224 and incoming PN sequence 310 align mathematically, correlation is detected at the correlation point and provided at the output 314 of correlator 312. This means the receiver doesn't need a predetermined time reference but just needs to wait for a correlation match. Correlator 312 may be optimized for correlating a large, fixed sequence such as incoming PN sequence 310. Correlator 312 may be implemented as a hardware embodiment as a component of GPS processor 128 or as a program of instructions or algorithm executed by a digital signal processor or microprocessor embodied as processor 128 or preferably may be implemented as an optical correlation embodied as processor 128.

Figure 4:
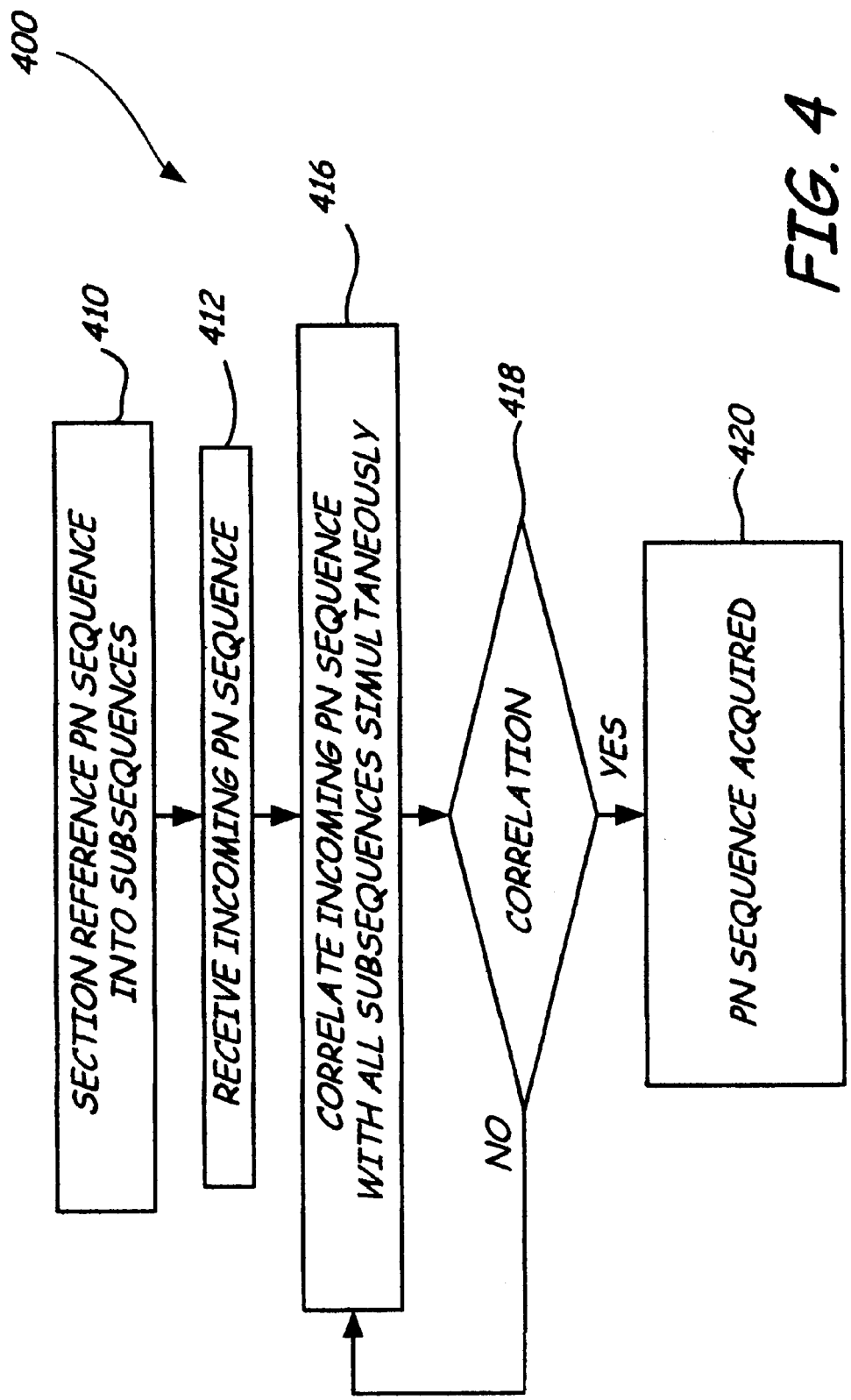
FIG. 4 is a flow diagram of a method for acquiring a PN sequence in accordance with the present invention.

Referring now to FIG. 4, a method for acquiring a PN sequence in accordance with the present invention will be discussed. The method 400 includes a step 410 for sectioning a reference PN sequence 210 into a plurality of subsequences 212–224. An incoming PN sequence 310 to be acquired is received by receiver 100 at step 412. Incoming PN sequence 310 continuously propagates through the receiver 100 and shifts with respect to reference subsequences 416 such that incoming PN subsequence 310 is correlated with all reference subsequences simultaneously at step 416. A determination is made at step 418 whether correlator 312 detects correlation between incoming PN sequence 310 and one of the reference subsequences 212–224. Incoming PN sequence 310 continues to shift with respect to reference subsequences 212–224 and in the event correlation is not detected, the correlation step 416 continues at a different point in the incoming PN subsequence 310. In the event correlation is detected at the correlation point step 418, incoming PN sequence is acquired at step 420 such that a GPS solution may be provided by processor 128.

Although the invention has been described with a certain degree of particularity, it should be recognized that elements thereof may be altered by persons skilled in the art without departing from the spirit and scope of the invention. One of the embodiments of the invention can be implemented as sets of instructions resident in a memory 132 or 134 of one or more processors such as processor 128 generally as described in FIG. 1. Such a processor may be considered generally as part of a computer system. Until required by the computer system or processor, the set of instructions may be stored in a computer readable memory. Further, the set of instructions can be stored in the memory of another computer and transmitted over a local area network or a wide area network, such as the Internet, as desired. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the direct acquisition of very large PN sequences in GPS systems of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of acquiring a pseudorandom (PN) sequence, comprising:

sectioning a reference PN sequence into a predetermined number of subsequences;

receiving the PN sequence from a remote source;

propagating the PN sequence through a correlator;

correlating the received PN sequence with each of the predetermined number of subsequences simultaneously as the received PN sequence propagates through the correlator;

waiting a period of time until the propagating received PN sequence correlates with one of the predetermined number of subsequences at a correlation point in the received PN sequence; and acquiring the PN sequence at the correlation point.

2. A method as claimed in claim 1, said predetermined number of subsequences being a plurality of uniformly spaced apart subsequences of the reference PN sequence with uniform gap lengths between the spaced apart subsequences.

3. A method as claimed in claim 2, wherein the period of time is a uniform gap length or less to reach the correlation point.

4. A method as claimed in claim 1 wherein the PN sequence is a GPS P(Y) code signal.

5. A program of instructions storable on a computer readable medium and executable by a computer for executing steps for a acquiring a pseudorandom (PN) sequence, the steps comprising:

sectioning a reference PN sequence into a predetermined number of subsequences;

receiving the PN sequence from a remote source;

propagating the PN sequence through a correlator;

correlating the received PN sequence with each of the predetermined number of subsequences simultaneously as the received PN sequence propagates through the correlator;

waiting a period of time until the propagating received PN sequence correlates with one of the predetermined number of subsequences at a correlation point in the received PN sequence; and acquiring the PN sequence at the correlation point.

6. A program of instructions as claimed in claim 5, said predetermined number of subsequences being a plurality of uniformly spaced apart subsequences of the reference PN sequence with uniform gap lengths between the spaced apart subsequences.

7. A program of instructions as claimed in claim 5, wherein the period of time is a uniform gap length or less to reach the correlation point.

8. A program of instructions as claimed in claim 5, said PN sequence being a GPS P(Y) code signal.

* * * * *